United States Patent [19]
Ramesh et al.

[11] Patent Number: 5,363,407
[45] Date of Patent: Nov. 8, 1994

[54] TRANSMITTER OPTIMIZATION FOR SPECTRALLY CONGESTED RADIO COMMUNICATION SYSTEMS

[75] Inventors: Rajaram Ramesh; Sandeep Chennakeshu, both of Schenectady, N.Y.

[73] Assignee: General Electric Company, Schenectady, N.Y.

[21] Appl. No.: 939,747

[22] Filed: Sep. 2, 1992

[51] Int. Cl.$^5$ ............................................. H04B 14/04
[52] U.S. Cl. ...................................... 375/34; 375/58; 455/63
[58] Field of Search .............................. 375/34, 38–40, 375/54, 56, 57, 58; 455/50.1, 52.3, 63

[56] References Cited

U.S. PATENT DOCUMENTS 4,962,510 10/1990 McDavid et al. .................... 375/67

OTHER PUBLICATIONS

Characterizing the Effects of Nonlinear Amplifiers on Linear Modulation for Digital Portable Radio Communications, by S. Ariyavisitakul and T. P. Liu, IEEE Transactions on Vehicular Technology, vol. 39, No. 4, pp. 383–389, Nov. 1990.
Rejection Method of Adjacent Channel Interference for Digital Land Mobile Communications, by S. Sampei and M. Yokohama, The Transactions of the IECE of Japan, vol. E 69, No. 5, pp. 578–580, May 1986.
Method of Rejecting Adjacent Channel Interference Using an Adaptive Equalizer, by N. Kinoshita and S. Sampei, Transactions of IEICE (section B), J71-B, 10, pp. 1119–1126, Oct. 1988.
Analysis for Spectrum Efficiency in Single Cell Trunked and Cellular Mobile Radio, IEEE Transactions on Vehicular Technology, vol. VT-35, No. 3, pp. 100–113, Aug. 1987.
Optimum FIR Transmitter and Receiver Filters for Data Transmission over Band-Limited Channels by P. R. Chevillat and G. Ungerboeck, IEEE Trans. on Commun. vol. 30, No. 8, pp. 1909–1915, Aug. 1982.
Ungerboeck Codes Do Not Shape the Signal Spectrum by E. Biglieri in the IEEE Transactions on Information Theory, vol. IT-32, Jul. 1986, pp. 595–596.
Linear and Nonlinear Programming, 2nd Edition by David G. LuenBerger, Chapter 12, Addison-Wesley Publishing Company, Inc., 1984.
"A Trellis Coded Modulation Scheme for Land Mobile Radio", by Sandeep Chennakeshu, Amer Hassan, Kumar Balachandran and John B. Anderson.
"Spectral Shaping Using Coded Modulation for Mobile Radio", R. Ramesh, S. Chennakeshu and A. Hassan.

*Primary Examiner*—Stephen Chin
*Assistant Examiner*—Young Tse
*Attorney, Agent, or Firm*—Lawrence P. Zale; Marvin Snyder

[57] ABSTRACT

A method of configuring an optimum communication system for communicating on adjacent frequency bands with minimal interference between adjacent channels comprises serially coupling a selected encoder to a mapper, a transmit filter, a low pass filter and a modulator, and constructing a receiver with a seriallycoupled receive filter and decoder. The transmit filter is optimized by choosing transmit filter coefficients $d_{opt}$ which maximize the inband to adjacent-band power. Transmitter coefficients $d_{opt}$ are obtained by solving an eigenvalue problem which takes into account the power spectrum of the encoder, mapper and receive filter. The optimum transmitter coefficients are then employed in the transmitter to shape the transmitted signal, increasing the adjacent channel interference protection ratio (ACIPR). In an alternative embodiment, further constraints are placed upon the system, such as reducing the combined impulse response of the transmit filter, low pass filter and the receive filter to zero at the beginning of subsequent symbol periods. The resulting system then exhibits an increased ACIPR along with a reduced intersymbol interference.

2 Claims, 8 Drawing Sheets

TRANSMITTER OPTIMIZATION FOR SPECTRALLY CONGESTED RADIO COMMUNICATION SYSTEMS

CROSS REFERENCES TO RELATED APPLICATIONS

This application is related to U.S. Patent application *Trellis Coding Technique to Improve Adjacent Channel Interference Protection Ratio in Land Mobile Radio Systems* Ser. No. 07/898,670 by S. Chennakeshu, A. Hassan and J. Anderson filed Jun. 15, 1992, and *Improved Trellis Coding Technique to Improve ACIPR in Land Mobile Radio Systems Under Peak Power Constraints* (Ser. No. 07/975,201, filed Jun. 15, 1992) by Sandeep Chennakeshu, R. Ramesh, Amer A. Hassan and John B. Anderson, both assigned to the present assignee and hereby incorporated by reference.

BACKGROUND OF THE INVENTION

1. Field of the Invention

This invention relates to land mobile radio systems and more specifically to minimizing interference from adjacent spectral frequencies in land mobile radio systems.

2. Description of Related Art

Conventional land mobile radio (LMR) channels employ narrow-band frequency division multiplexed (FDMA) systems with different radio units assigned to different frequency bands. These bands are typically 25 KHz wide. There is an immediate need for an increase in capacity of LMR systems in the U.S. for such applications as public safety trunking. The trend is to increase capacity by splitting each existing 25 KHz channel used in LMR systems into two 12.5 KHz channels. However, this results in increased adjacent channel interference (ACI), unless there is a considerable reduction in data rate, which is undesirable. ACI is interference introduced at a receiver from a transmitter broadcasting at a frequency corresponding to an adjacent channel and is sometimes called adjacent channel 'splatter'.

In a typical LMR system, communication between mobile units takes place through a base unit (base station). Each base station serves a certain geographic area. Communication between mobile units and base units takes place on a pair of frequencies that are separated, usually widely, to prevent interference. One frequency is needed for base to mobile communication and the other frequency in the pair is used for mobile to base communication. In some situations mobile units can communicate with each other directly without going through the base unit. This is called "Talk-Around". A pair of frequencies are also used in Talk Around communications, one for each direction.

A problem occurs if two mobile units employ spectrally adjacent frequencies to communicate with their base units. Usually, mobile units within the same area will not be assigned spectrally adjacent frequencies but mobiles in contiguous geographic areas can use spectrally adjacent frequencies. The same situation exists with respect to frequency assignments to base units.

A measure of how well a system resists ACI is an ACI protection ratio (ACIPR). For analog FM the ACIPR is specified to be in the range of 65-70 dB. Some digital modulation schemes offer adequate spectral efficiency but lower ACIPR (in the range of 45-50 dB). The ACIPR values may be augmented by several techniques. However, the problem gets increasingly difficult as the need for capacity and higher spectral efficiency arises.

Some of the commonly adopted techniques to improve ACIPR for digital modulation are antenna diversity in which more than one antenna receives a signal and the receiver chooses the signal from the antenna having a better signal strength. Antenna diversity is useful in providing a margin of 3-5 dB in ACIPR. Antenna diversity is further described in *Characterizing the Effects of Nonlinear Amplifiers on Linear Modulation for Digital Portable Radio Communications*, by S. Ariyavisitakul and T. P. Liu, IEEE Transactions on Vehicular Technology, Vol. 39, No. 4, pp. 383-389, November, 1990.

Another technique to improve ACIPR is interference rejection and cancellation where an estimator is employed in estimating what a signal should be, and subtracting the estimated signal from the actual signal to synthesize an interference signal which is then subtracted from the further received signals. A similar technique is interference rejection using filtering described in *Rejection Method of Adjacent Channel Interference for Digital Land Mobile Communications*, by S. Sampei and M. Yokohama, The Transactions of the IECE of Japan, Vol. E 69, No. 5, pp. 578-580, May 1986. Interference cancellation is described in *Method of Rejecting Adjacent Channel Interference Using an Adaptive Equalizer*, by N. Kinoshita and S. Sampei, Transactions of IEICE (section B), J71-B, 10, pp. 1119-1126, October, 1988. Interference rejection and cancellation involves complex receiver circuitry and is highly dependent upon the channel conditions and interference power. These techniques can provide up to 6-10 dB of gain if properly implemented.

Transmitter power control is described by Y. Nagata and Y. Akaiwa in *Analysis for Spectrum Efficiency in Single Cell Trunked and Cellular Mobile Radio*, IEEE Transactions on Vehicular Technology, Vol. VT-35, No. 3, pp. 100-113, August, 1987. Transmitter power control offers a larger gain (10-15 dB) in ACIPR by controlling the transmit power of mobile stations. In such transmitter power control, the mobile units which are closer to the base station transmit at a lower power in order not to "splash" other mobile units. The base station power is not varied. This scheme is complex and the complexity increases with capacity.

Optimization of transmitted in-band to adjacent band power has been achieved by choosing a transmitted code which minimizes ACIPR as described in *Trellis Coding Technique to Improve Adjacent Channel Interference Protection Ratio in Land Mobile Radio Systems* Ser. No. 07/898,670 by S. Chennakeshu, A. Hassan and J. Anderson and *Improved Trellis Coding Technique to Improve ACIPR in Land Mobile Radio Systems Under Peak Power Constraints* (Ser. No. 07/975,201) by Sandeep Chennakeshu, R. Ramesh, Amer A. Hassan and John B. Anderson, both filed Jun. 15, 1992. However these techniques did not address transmit filter optimization for maximization of ACIPR.

Maximization of in-band power alone using optimized transmit and receive filters was described in *Optimum FIR Transmitter and Receiver Filters for Data Transmission over Band-Limited Channels* by P. R. Chevillat and G. Ungerboeck, IEEE Trans. on Commun. Vol. 30, No. 8, pp. 1909-1915, August, 1982. The problem with this technique is that it does not account for adjacent channel power relative to in-band power and hence does not provide adequate ACIPR optimization.

Currently, there is a need for a spectrally efficient modulation scheme that exhibits high ACIPR and offers a transmit range comparable to existing analog FM systems.

OBJECTS OF THE INVENTION

An object of the present invention is to provide a communication system having high spectral efficiency and a high channel capacity.

Another object of the invention is to provide a communication system having reduced adjacent channel interference relative to that of a conventional scheme.

SUMMARY OF THE INVENTION

A method of configuring a communication system for communicating on adjacent frequency bands with minimal interference between adjacent channels comprises selecting an encoder, a transmit filter, a low pass filter and a modulator for the transmitter, and a receive filter and decoder for a receiver. Mapping vectors, encoder alphabet, a number of constellation points, and an encoder set, are then chosen. The power spectrum $E(f)$ of the encoder is determined. The transmit filter is optimized by choosing transmit filter coefficients which maximize the in-band to adjacent-band power. These coefficients are obtained by solving an eigenvalue problem which takes into account the power spectrum of the encoder-mapper and receive filter. In an alternative embodiment, further constraints are placed upon the system, such as reducing the combined impulse response of the transmit filter, low pass filter and the receive filter to zero at the beginning of subsequent symbol periods. Maximizing the in-band to adjacent band power increases the ACIPR and also allows for increased data transmission rates.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIG. 2b is a diagram of overlapping frequency spectra of three adjacent LMR channels confined to the bandwidth of FIG. 2a.

FIG. 4b is a diagram of a frequency spectrum of a shaped transmitted signal superimposed on the idealized receive filter magnitude response (receive window) of FIG. 4a.

DETAILED DESCRIPTION OF THE INVENTION

Figure 1:
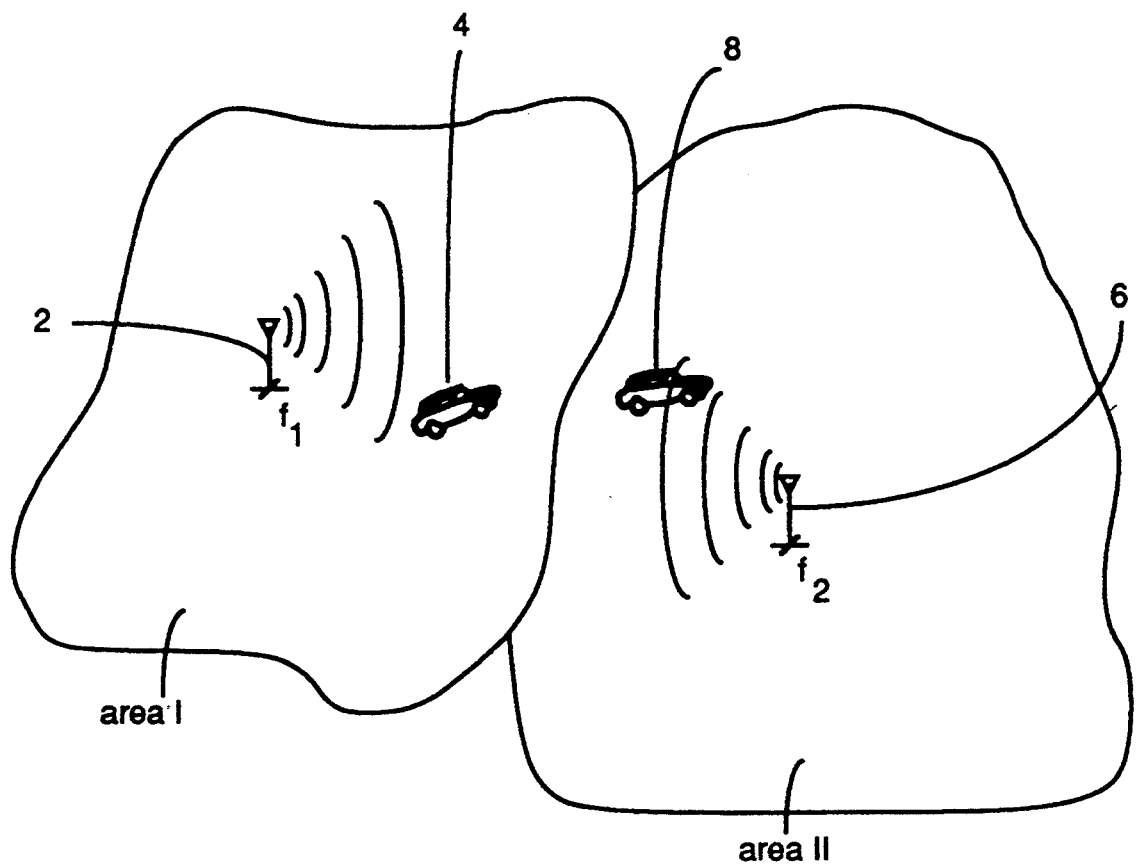
FIG. 1 is an illustration of two LMR systems communicating in geographically adjacent areas using adjacent frequency bands.

Typically, in LMR systems, contiguous geographic areas can use spectrally adjacent bands. In FIG. 1, area I and area II are geographically adjacent regions. An LMR base unit 2 communicates with mobile unit 4 at a frequency $f_1$. Similarly, an LMR base unit 6 communicates with a mobile unit 8 at a frequency $f_2$. Since frequency bands $f_1$ and $f_2$ may be spectrally adjacent, base unit 2 may "splatter" into the channel used by base unit 6 and mobile unit 8, resulting in ACI. The same situation can occur between mobile units communicating on spectrally adjacent frequencies. It is noted that this problem of ACI occurs only between frequency bands assigned to mobile-base communication or vice versa. There is no such interference between the two directions of communication when both are in operation simultaneously due to adequate frequency separation.

Figure 2A:
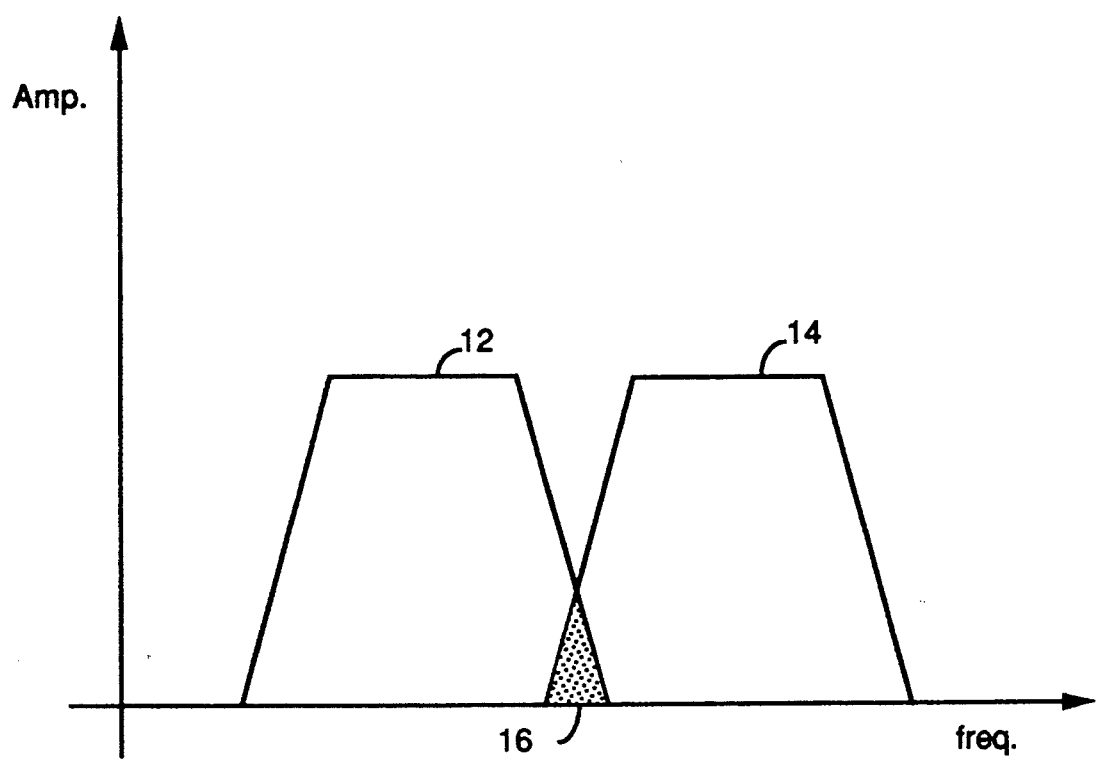
FIG. 2a is a diagram of overlapping frequency spectra of two adjacent channel LMR transmitted signals confined to a limited bandwidth.

FIG. 2a is a diagram of frequency spectra 12 and 14 of two LMR transmitted signals. Spectrum 12 overlaps spectrum 14 causing ACI 16.

Figure 2B:
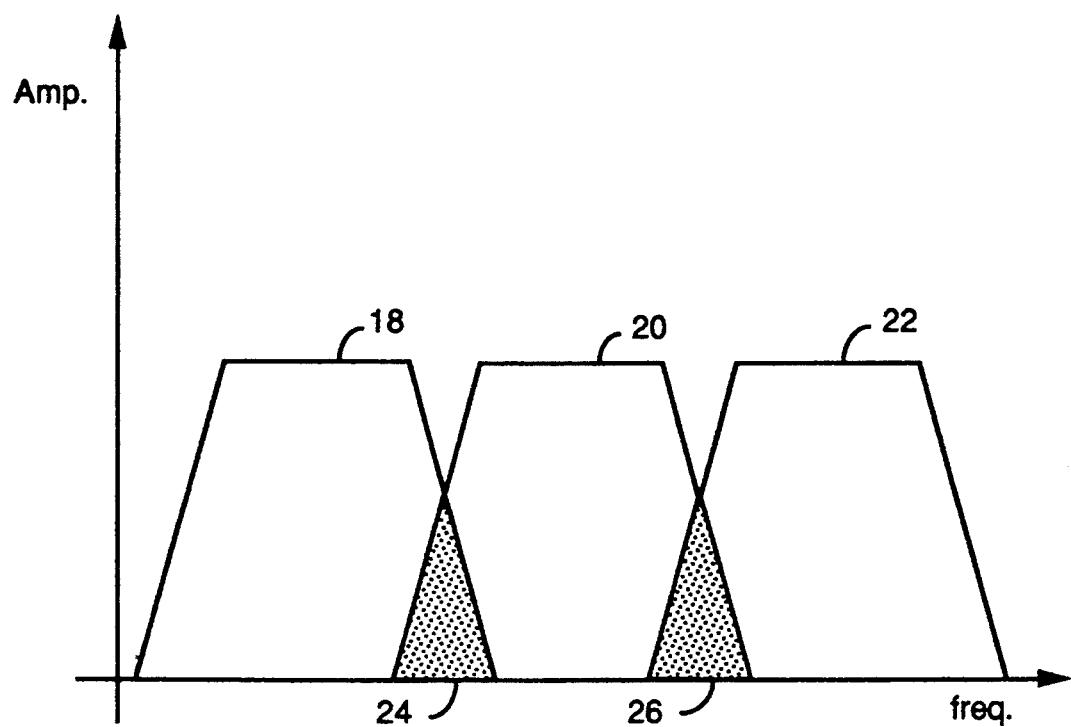

FIG. 2b is a diagram of LMR spectra 18, 20, 22 of three signals in the same bandwidth as FIG. 2a. The overlap between channels 18 and 20 creates ACI 24. The overlap between channels 20 and 22 creates ACI 26. It can be seen that the areas of ACI 24 and 26 are much larger than ACI area 16 of FIG. 2a. FIGS. 2a and 2b indicate that as the number of channels within a limited frequency band increases, the amount of ACI also increases, other factors being equal. In order for LMR systems to perform reliably, a transmission scheme must be used that reduces the ACI.

Figure 3:
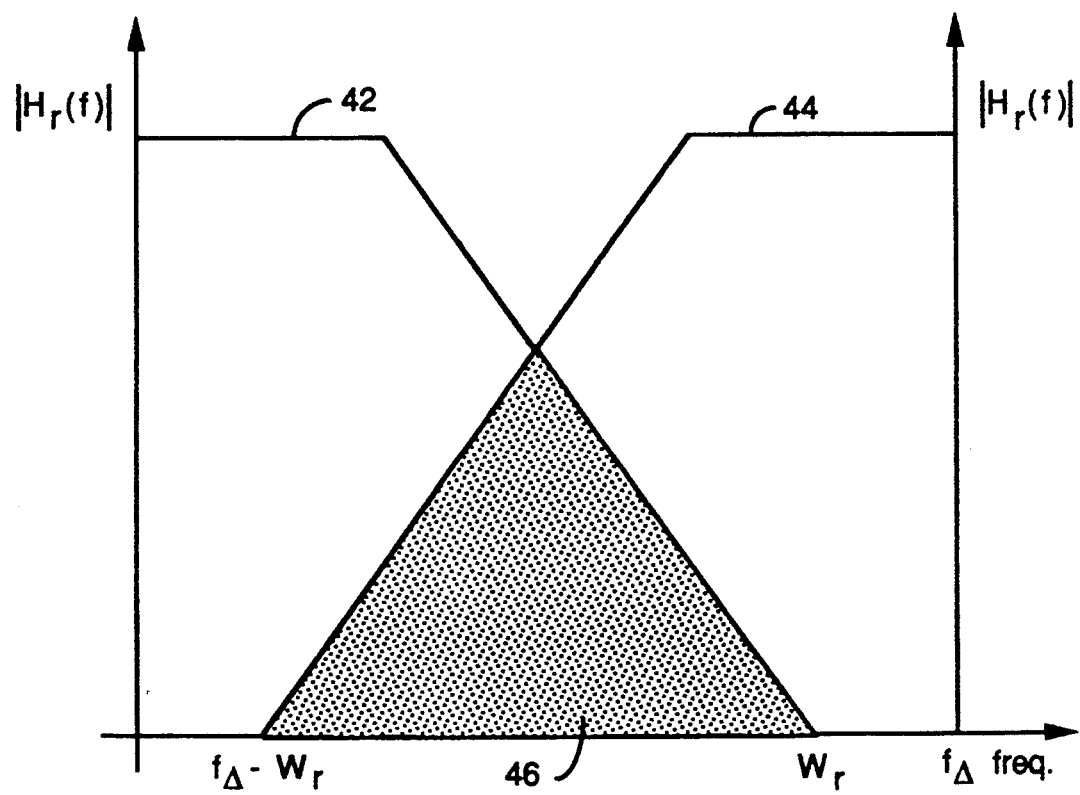
FIG. 3 is a partial diagram of the frequency spectrum of two adjacent channel LMR transmitted signals.

FIG. 3 shows the spectrum of a frequency window 42 in which a receiver employed in a prior art system would receive signals, along with the spectrum of a transmitted signal 44 in an adjacent band that partially overlaps the receive window 42 and is received by the receiver as an interference signal 46. Interference signal 46 represents interference introduced by the adjacent band transmitted signal 44. An adjacent channel interference protection ratio (ACIPR) for this system is defined as:

$$ACIPR = \frac{P_{ib}}{P_{ab}} - \frac{C}{I} \text{ (in dB)} \quad (1)$$

where $P_{ib}$ is the desired in-band power, being the power of the transmitted signal within receive window 42, and $P_{ab}$ is the adjacent-band power, being the power of the interference signal within receive window 42. For most practical digital modulation schemes, the achievable ACIPR is limited by $P_{ib}/P_{ab}$ rather than C/I. C/I is the carrier to interference ratio, which allows only moderate increases in ACIPR. The conventional schemes do not attempt to improve the ACIPR through proper design of the transmitted signal, which could increase $P_{ib}/P_{ab}$ and potentially yield much larger values of ACIPR. It may be noted that having improved $P_{ib}/P_{ab}$ we can use the techniques, described earlier, to lower C/I and thereby improve ACIPR further.

Figure 4A:
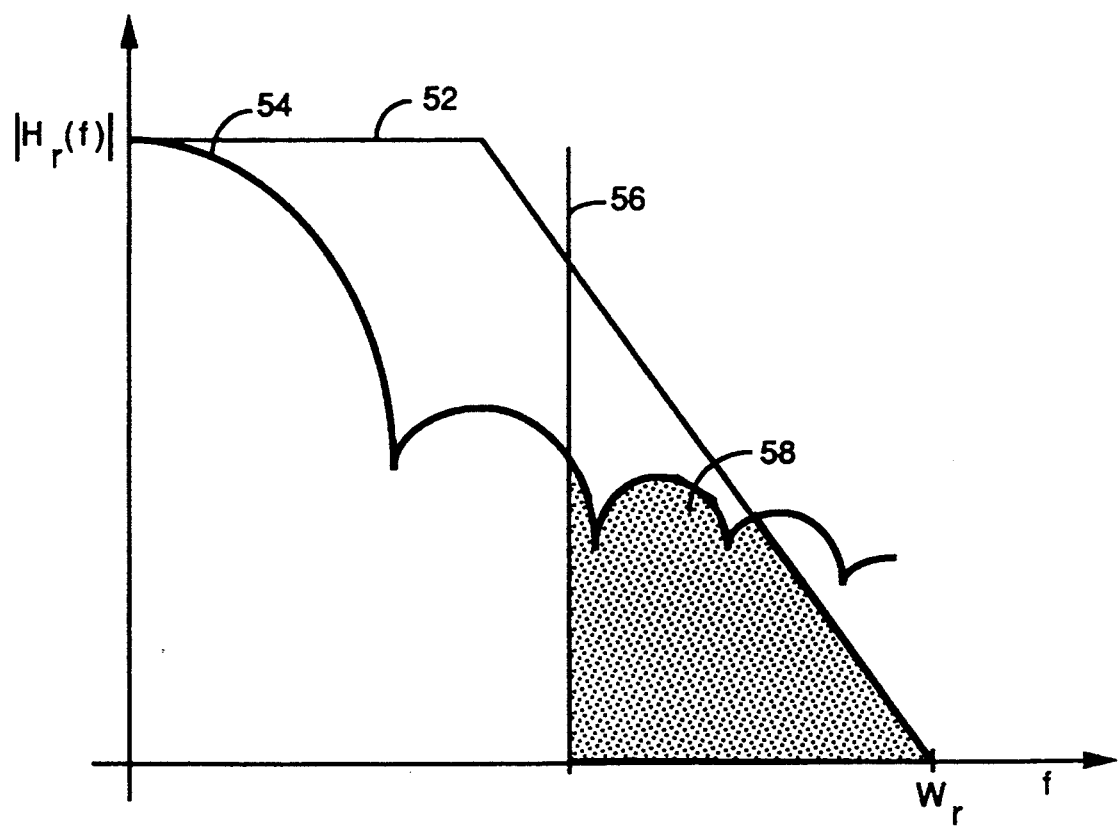
FIG. 4a is a diagram of a frequency spectrum of a transmitted signal superimposed on an idealized receive filter magnitude response (receive window).

The conventional communication techniques described in "Background of the Invention", except for transmitter power control and applications related to the present application, are based on reducing the receiver sensitivity (C/I). In FIG. 4a the frequency spectrum of a transmitted signal 54 is shown superimposed on a receive window 52. At a frequency 56, the signal 54 begins to overlap with an adjacent signal. Signal 58 which lies to the right of frequency 56 is introduced as interference in an adjacent channel.

Figure 4B:
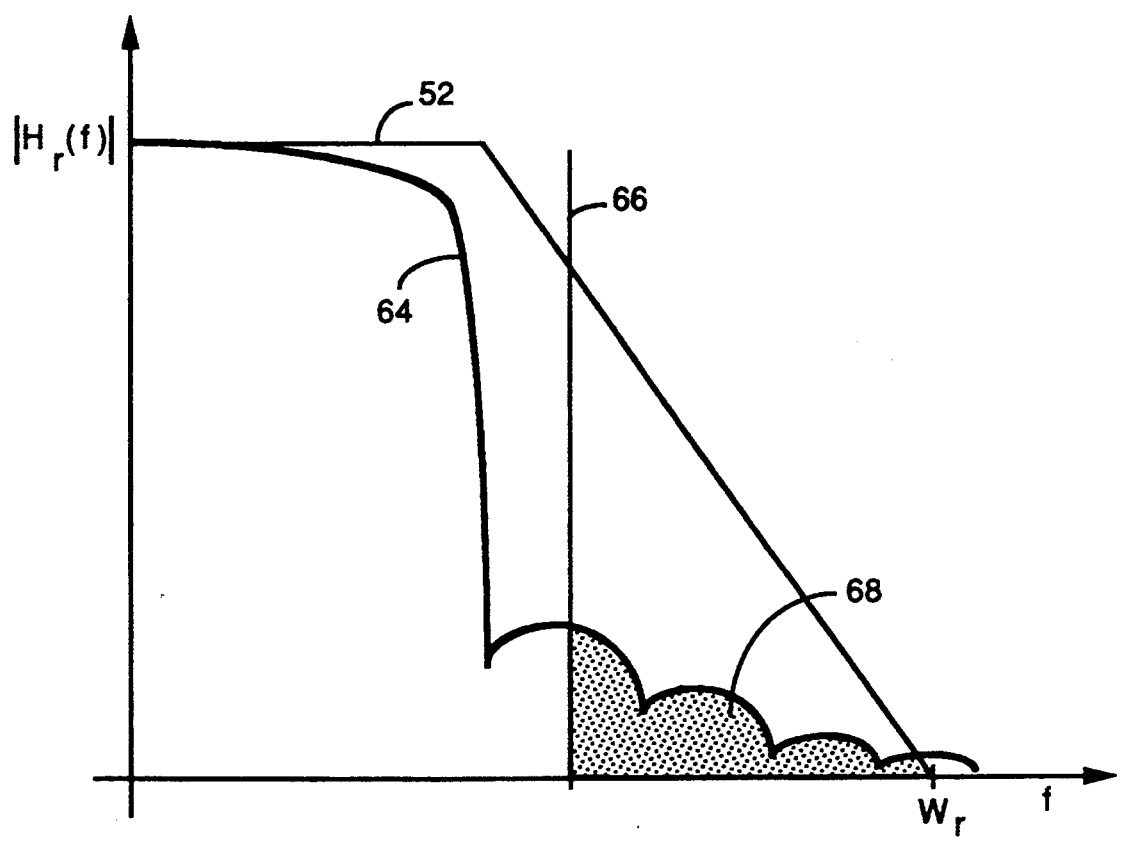

In FIG. 4b, a spectrum of a transmitted signal 64 is shown superimposed in a receive window 52 which is the same as receive window 52 of FIG. 4a. At a frequency 66, signal 64 begins to overlap with adjacent signals. Interference signal 68 is outside the channel. Comparing signal 64 of FIG. 4b and signal 54 of FIG. 4a, it is observed that signal 64 of FIG. 4b has a greater percentage of its energy concentrated inside the desired channel. The shaping of the transmitted spectrum of signal 64 allows for a greater in-band to adjacent-band power ratio ($P_{ib}/P_{ab}$). ACIPR, as described by equation (1), is limited by the ratio of in-band to adjacent-band power ($P_{ib}/P_{ab}$). The shaping of the signal spectrum also allows signal 64 of FIG. 4b to produce a smaller percentage of interference 68 in an adjacent channel, as opposed to the interference 58 of FIG. 4a.

Figure 5:
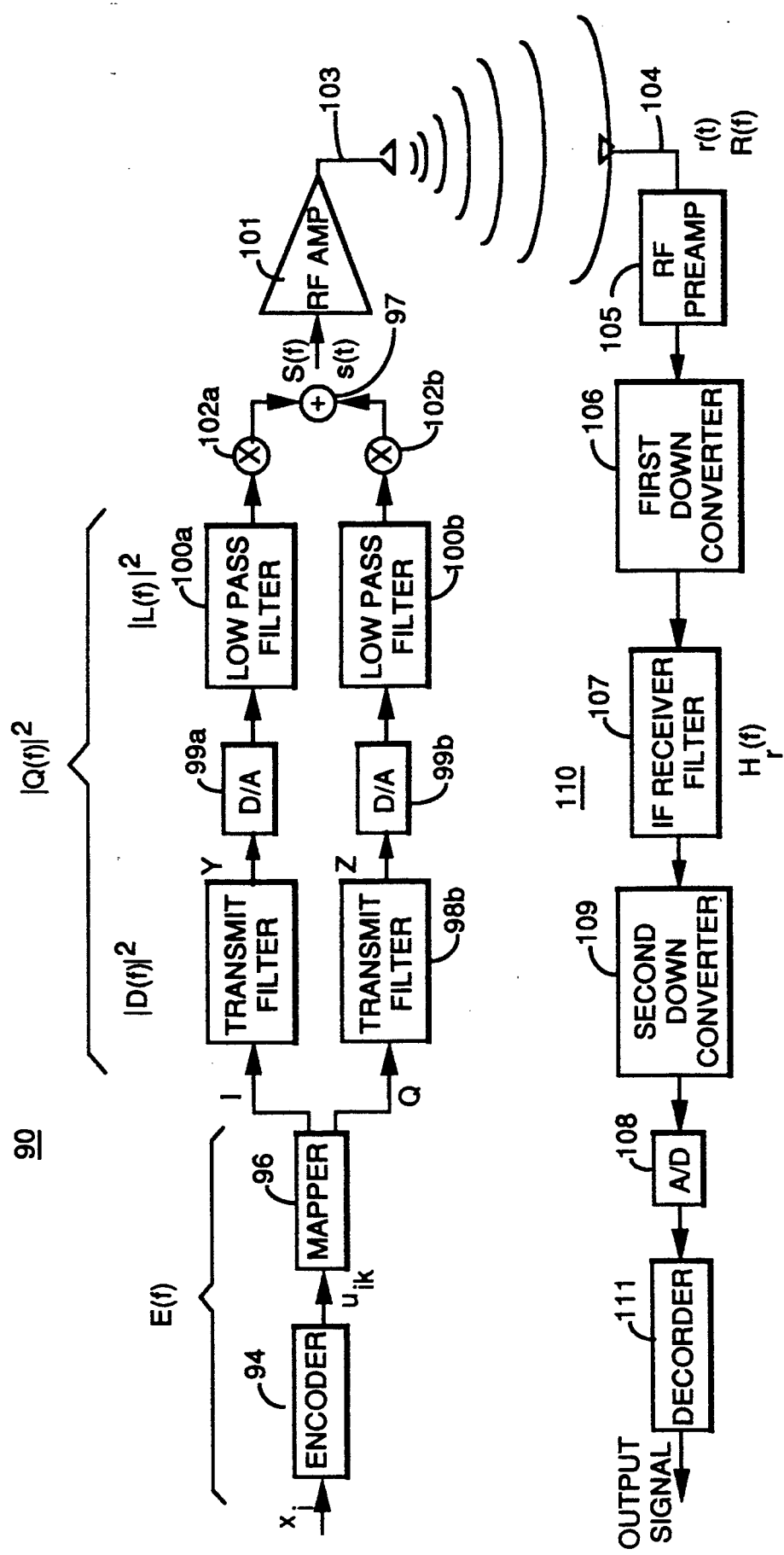
FIG. 5 is a simplified block diagram of a communication system employing the present invention.

A simplified block diagram of a communication system embodying the invention is shown in FIG. 5. This diagram may represent a base station or mobile unit. A sequential signal $x_i$(i=0, 1, 2 ... ) desired to be transmitted is introduced into an encoder 94 of a transmitter 90. The input signal $x_i$ may be a digital signal or an analog signal which has been digitized. Encoder 94 transforms input signal $x_i$ to an encoded signal which is passed to a mapper 96. Mapper 96 maps the encoded signal onto a symbol from a signal constellation $c_i$(i=1,2,3 ... ), such as a phase shift keyed signal constellation. This signal may be represented by its in-phase (I) and quadrature (Q) components which are passed through parallel processing branches. Each of these signals is passed through transmit filters 98a, 98b, D/A converters 99a, 99b, and low pass filters 100a, 100b, and is frequency shifted by quadrature modulators 102a, 102b and finally mixed by a summer 97. The signal from summer 97 is then sent to an rf amplifier 101 which increases the gain of the signal. The rf amplifier passes the amplified signal to an antenna 103 which transmits to a second antenna 104 at a receiver 110. The received signal is passed through an RF preamplifier 105 to a down converter which reduces the frequency of the received signal in the MHz. range to an intermediate frequency signal in the kHz. range. The intermediate frequency signal is passed to an intermediate frequency receive filter 107, then through a down converter 109 to produce a filtered baseband signal. The filtered baseband signal is digitized by an analog-to-digital converter 108 and passed to a decoder 111 which processes the digitized baseband signal to recover the transmitted signal information.

Properly designed transmit filters 98a and 98b (usually the same) can be chosen to improve the ratio of in-band to adjacent power ($P_{ib}/P_{ab}$).

The ACIPR expression given by equation (1) can be expanded as follows:

$$ACIPR = \frac{\int_{-W_r}^{W_r} H_r(f)S(f)df}{\int_{-W_r}^{W_r} H_r(f)S(f-f_\Delta)df} - \frac{C}{I} \text{ (in dB)} \quad (2)$$

where S(f) is the transmitted signal power spectrum at antenna 103, and $H_r(f)$ is the magnitude squared frequency response of receive filter 107 whose frequency response is R(f), i.e., $H_r(f)=|R(f)|^2$. The one-sided bandwidth of receive filter 107 is $W_r$, and $f_\Delta$ is the frequency separation between the desired channel and adjacent channel. It should be noted that C/I determines the bit error rate through the minimum Euclidean distance between the transmitted symbols.

The motivation for spectral shaping to improve ACIPR is better understood by expanding S(f) into its component terms. The encoder 94 is modeled as a finite-state sequential machine with N possible states {1, 2, .. ., N}, comprising a shift register followed by mapper 96. Encoder 94 is fed with an input signal being a sequence of stationary independent and identically distributed symbols {0, 1, ... , J−1}, which may be non-binary. The output signal of encoder 94 passes through mapper 96 to produce a coded sequence of symbols represented by "I" and "Q" in FIG. 5, which is shaped by the transmit filters 98a, 98b and low pass filters 100a, 100b. The resulting output signal can be represented as:

$$s(t) = \sum_{i=-\infty}^{\infty} c_i q(t - iT_s) \quad (3)$$

where q(t) represents the combined impulse response of transmit filters 98a, 98b and low pass filters 100a, 100b with combined frequency response Q(f). $T_s$ is the symbol duration, or the inverse of the transmission rate.

The power spectrum of s(t), denoted by S(f), can be decomposed into two parts, one depending on the encoder-mapper E(f) and one depending on the combined transmit filter and lowpass filter frequency response Q(f). This is represented as:

$$S(f)=E(f)|Q(f)|^2 \quad (4)$$

The power spectrum E(f) due to the encoder-mapper can be determined using the method described in *Ungerboeck Codes Do Not Shape the Signal Spectrum* by E. Biglieri in the IEEE Transactions on Information Theory, vol IT-32, July, 1986, pages 595–596. Frequency response Q(f) may be decomposed into a transmit filter frequency response D(f) and a low-pass filter frequency response L(f). This results in:

$$S(f)=E(f)|L(f)|^2|D(f)|^2 \quad (5)$$

The frequency response of the transmit filter D(f) may be described by:

$$D(f) = \sum_{k=0}^{M-1} d_k \exp(-j2\pi f kT_s/b) \quad (6)$$

where $T_s$ is the symbol duration and b is the number of coefficients of the transmit filter per symbol time. Using this the expression for the spectrum of the transmitted signal, the expression for in-band power to adjacent-band power is:

$$\frac{P_{ib}}{P_{ab}} = \frac{\int_{-W_r}^{W_r} |D(f)|^2|L(f)|^2 E(f)H_r(f)df}{\int_{-W_r}^{W_r} |D(f-f_\Delta)|^2|L(f-f_\Delta)|^2 E(f-f_\Delta)H_r(f)df} \quad (7)$$

where E(f) is the spectral power contribution due to encoder 94 and mapper 96. Each encoder will have its unique spectral power contribution which is based upon the probability of output symbols, the code selected, the mapping to a constellation etc.

The coefficients $d_k$ in Eq. (6) are chosen to maximize the quantity ($P_{ib}/P_{ab}$) of Eq. (7). This may be accomplished by a number of conventional optimization techniques or by eigen analysis.

Figure 6:
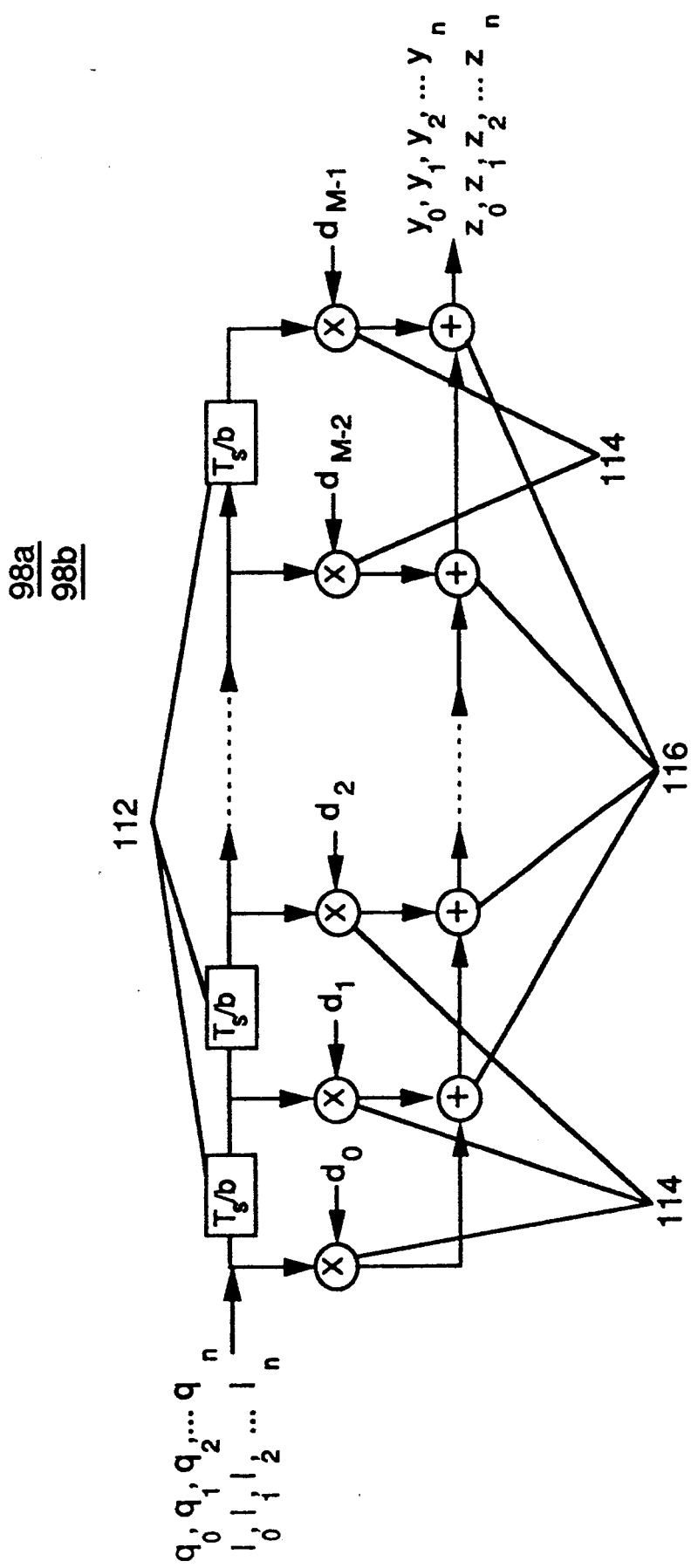
FIG. 6 is a more detailed block diagram of the transmit filters of FIG. 5.

FIG. 6 shows transmit filters 98a, 98b of FIG. 5 in a more detailed view. In-phase samples $I_0, I_1, I_2 \ldots I_n$ from mapper 96 and quadrature phase samples $Q_0, Q_1, Q_2 \ldots Q_n$ from mapper 96 enter transmit filters 98a, 98b as continuous strings, respectively. Each sample is delayed by a plurality of delay circuits 112 which delay the signal by a value being equal to $T_s/b$. Each sample of the string is multiplied by its corresponding transmit filter coefficient $d_0, d_1, d_2 \ldots d_{M-1}$, respectively, in multipliers 114 and summed together in a plurality of summers 116 to result in a filtered signal $Y_0, Y_1, Y_2 \ldots Y_n$ and a filtered signal $Z_0, Z_1, Z_2 \ldots Z_n$ from transmit filters 98a, 98b of FIG. 5, respectively.

The in-band to adjacent-band power may be expressed as:

$$\frac{P_{ib}}{P_{ab}} = \frac{d^*Nd}{d^*Dd} \qquad (8)$$

where d is the set of transmitter coefficients represented by the vector $[d_0, D_1, \ldots d_{M-1}]^T$, $d^*$ is the transpose conjugate of the transmitter coefficients, and N and D are a plurality of matrices each defined respectively by:

$$N = \int_{-W_r}^{W_r} M_1(f)H_r(f)\exp(-j2\pi fkT_s)E(f)df \qquad (9)$$

$$D = \int_{-W_r}^{W_r} M_1(f - f_\Delta)H_r(f)\exp\{-j2\pi(f - f_\Delta)kT_s\}E(f)df \qquad (10)$$

and the i, jth element of the matrix $M_1(f)$ is given by:

$$\{M_1(f)\}_{i,j} = |L(f)|^2\exp\left(j2\pi f(i-j)\frac{T_s}{b}\right). \qquad (11)$$

The optimization filter coefficients $d_{opt}$ are given by maximizing Eq. (8) for d:

$$d_{opt} = \max_d\left(\frac{d^*Nd}{d^*Dd}\right) \qquad (12)$$

The solution $d_{opt}$ is given by the eigenvector corresponding to the maximum eigenvalue of the eigenvalue problem:

$$D^{-1}Nd_{opt} = \lambda d_{opt} \qquad (13)$$

where $\lambda$ is the maximum achievable in-band to adjacent-band power and $D^{-1}$ is the inverse of the matrix D. Transmit filters 98a, 98b are then constructed using the resulting $d_{opt}$ coefficients which maximize the in-band to adjacent-band power ratio to result in a communication system having increased ACIPR.

A summary of the optimization procedure to select appropriate transmitter coefficients $d_{opt}$ is described below:

1. Construct a transmitter having an encoder with a memory length L and capable of being in a plurality of encoder states coupled to a mapper that is coupled to two parallel branches, each branch having a transmit filter with a transfer function D(f), a digital-to-analog converter, a low pass filter having a transfer function L(f) and a modulator coupled in series, both modulators being coupled to a summer, the summer serially coupled to an rf amplifier and a transmit antenna;
2. construct a receiver having a receive antenna, an rf preamplifier, a first down converter, a receive filter having a power spectrum $H_r(f)$, a second down converter, an analog-to-digital converter and a decoder serially coupled;
3. choose a symbol period, $T_s$;
4. determine E(f), the spectral power contribution due to encoder and mapper;
5. solve the eigenvalue problem for $d_{opt}$:

$$D^{-1}Nd_{opt} = \lambda d_{opt}$$

where $d_{opt}$ is the set of transmitter coefficients, N and D are a plurality of matrices each defined respectively by:

$$N = \int_{-W_r}^{W_r} M_1(f)H_r(f)E(f)df$$

$$D = \int_{-W_r}^{W_r} M_1(f - f_\Delta)H_r(f)E(f - f_\Delta)df$$

and $$\{M_1(f)\}_{i,j} = |L(f)|^2\exp\left(j2\pi f(i-j)\frac{T_s}{b}\right);$$

where i, j range from 0 through $M - 1$ where i,j range from 0 through $M - 1$.
6. initialize the transmit filter to the optimum transmit filter coefficients $d_{opt}$ for subsequent transmissions.

A second embodiment of the present invention involves an additional constraint imposed on the transmit filters. This constraint requires that transmit filters 98a, 98b produce no interference between transmitted symbols at the receiver end, known as intersymbol interference (ISI). The signal at the receiving end may be represented as:

$$r(t) = \sum_{i=-\infty}^{\infty} c_i g(t - iT_s) \qquad (14)$$

where g(t) is the impulse response corresponding to the combined response of the transmit filter, the lowpass filter and the receive filter. If r(t) is sampled at $t = kT_s$, the result is:

$$r(kT_s) = \sum_{i=-\infty}^{\infty} c_i g(kT_s - iT_s) \qquad (15)$$

which is, in general, an average of all transmitted symbols. However, if $g(kT_s - iT_s)$ is forced to be zero except when i=k, then $r(kT_s)=c(k)$. Thus, a single symbol is obtained without any interference from the other symbols. This constraint on g(t) can be satisfied by suitably choosing the transmit filter coefficients d in Eqs. (6, 7). This condition can be expressed using the frequency response of the transmit and receive filters for $t=kT_s$:

$$g(kT_s) = \quad (16)$$

$$\int_{-W_r}^{W_r} \sum_{i=0}^{M-1} d_i \exp(-j2\pi i T_s/b) L(f) R(f) \exp(j2\pi f k T_s) df = 0$$

for $k \neq 0$. Requiring no ISI for a number of samples denoted $L_s$, the restriction on d becomes:

$$R_s d = 0 \quad (17)$$

where the k, lth element of the matrix $R_s$ is given by:

$$[R_s]_{k,l} = \int_{-W}^{W} L(f)R(f)\exp\left\{j2\pi f\left(kT_s - l\frac{T_s}{b}\right)\right\}. \quad (18)$$

The matrix $R_s$ has $L_s$ rows. If the number of constraints $L_s$ is less than the number of independent variables, i.e., the number of elements of d, the optimum d can be found to maximize the in-band power to adjacent-band power while satisfying the no ISI condition. This problem is a constrained optimization of the form:

$$d_{opt} = \max_d \left(\frac{d^*Nd}{d^*Dd}\right) \quad (19a)$$

and $$R_s d = 0. \quad (19b)$$

This problem can be solved using conventional constrained optimization methods, such as that described in *Linear and Nonlinear Programming*, 2nd Edition by David G. LuenBerger, Chapter 12, Addison-Wesley Publishing Company, Inc., 1984.

Transmitter coefficients $d_{opt}$ that satisfy the necessary constraint on g(t), yet maximize the in-band to adjacent-band power, viz, ($P_{ib}/P_{ab}$) of Eq. (7), are incorporated into transmit filters 98a, 98b of FIG. 5 for transmitter filter coefficients $d_0, d_1, d_2, \ldots d_n$ as shown in FIG. 6. Subsequent transmissions employ this configuration to result in a communications system having optimal ACIPR and minimal intersymbol interference.

The present invention also takes into account the spectral characteristics $H_r(f)$ of receive filter 107 in its optimization, allowing shaping of the transmitted signal in a manner to achieve the best power distribution within its band (window).

Further, although described for LMR channels, the invention described herein is equally applicable to other spectrally congested channels.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of configuring a communication system for communicating signals on adjacent channels, said system including a transmitter having an encoder with a memory length L and capable of being in a plurality of encoder states N, a mapper coupled to said encoder, a transmit filter with a transfer function D(f) coupled to said mapper, a low pass filter having a transfer function L(f) coupled to said transmit filter and a modulator coupled to said low pass filter, said system further including a receiver including a receive filter having a power spectrum $H_r(f)$ and a decoder coupled to said receive filter, comprising the steps of:

a) choosing a symbol period $T_s$;
   b) determining a combined power spectrum E(f) for the encoder and mapper;
   c) solving the following equation, which is a standard eigenvalue problem, for a maximum eigenvalue $\lambda$, and its corresponding eigenvector $d_{opt}$ which represents a set of transmitter coefficients:

$$D^{-1}Nd_{opt} = \lambda d_{opt}$$

where N and D are a plurality of matrices each defined respectively by:

$$N = \int_{-W_r}^{W_r} M_1(f)H_r(f)E(f)df$$

$$D = \int_{-W_r}^{W_r} M_1(f - f_\Delta)H_r(f)E(f - f_\Delta)df$$

and $$\{M_1(f)\}_{i,j} = |L(f)|^2 \exp\left\{j2\pi f(i - j)\frac{T_s}{b}\right\},$$

where i, j range from 0 through $M-1$; f is frequency, $f_\Delta$ is the frequency separation between said adjacent channels, b is a number of samples in sample period $T_s$, $W_r$ is the one-sided bandwidth of the receive filter; and d) initializing said transmit filter to the optimum transmit filter coefficients $d_{opt}$ for future transmissions so as to result in a communications system having an increased adjacent channel interference protection ratio.

2. The method of configuring a communication system as recited in claim 1 wherein step "c" further includes solving the optimization problem $$d_{opt} = \max_d \left(\frac{d^*Nd}{d^*Dd}\right)$$

with the constraint that:

$$R_s d = 0$$

where d* is the transpose conjugate of d, $$[R_s]_{k,l} = \int_{-W}^{W} L(f)R(f)\exp\left\{j2\pi f\left(kT_s - l\frac{T_s}{b}\right)\right\},$$

where $[R_s]_{k,l}$ is the k, lth element of the matrix $R_s$ and $|R(f)|^2 = H_4(f)$.

* * * * *